UNITED STATES PATENT OFFICE.

CARL BOSCH, ALWIN MITTASCH, AND HANS WOLF, OF LUDWIGSHAFEN-ON-THE-RHINE, AND GEORG STERN, OF MANNHEIM, GERMANY, ASSIGNORS TO BADISCHE ANILIN & SODA FABRIK, OF LUDWIGSHAFEN-ON-THE-RHINE, GERMANY, A CORPORATION.

PRODUCTION OF AMMONIA AND CATALYTIC AGENTS FOR USE THEREIN.

1,068,967.          Specification of Letters Patent.        Patented July 29, 1913.

No Drawing. Original application filed December 24, 1910, Serial No. 599,100. Divided and this application filed January 10, 1912. Serial No. 670,444.

*To all whom it may concern:*

Be it known that we, CARL BOSCH, ALWIN MITTASCH, HANS WOLF, and GEORG STERN, subjects the first and fourth of the King of Prussia, the second of the King of Saxony, and the third of the King of Bavaria. residing the first three at Ludwigshafen-on-the-Rhine and the fourth at Mannheim, all in Germany, have invented certain new and useful Improvements in the Production of Ammonia and Catalytic Agents for Use Therein, which invention is divided out of our application for Letters Patent filed December 24, 1910, Serial No. 599,100, and of which the following is a specification.

Our invention relates to the manufacture of ammonia by synthesis from its elements and in catalytic agents for use in the said manufacture.

In the specification of our application for patent Serial No. 599,101 we have described a new form of iron which is capable of use as a catalytic agent in the manufacture of ammonia from its elements, and we have further shown that the catalytic power of iron can be improved by the presence of certain bodies which we have termed "promoters". We have further shown in the said specification that certain other bodies act as contact poisons and tend to destroy the catalytic power of iron for converting a mixture of nitrogen and hydrogen into ammonia. Further, in the application for patent Serial No. 599,100, is described and claimed generically the production of ammonia when making use of a catalytic agent, together with a promoter in each case. In this application we now desire to claim specifically the production of ammonia while making use of barium and a promoter, and also such catalytic mixture itself. Such production and catalytic mixture are claimed generically in the aforesaid application Serial No. 599,100, but are not claimed specifically therein. In continuing our researches on the synthetic manufacture of ammonia from its elements, we have further discovered that the power of barium as a catalytic agent for the production of ammonia by synthesis can also be improved by the presence of promoters, and that other bodies act as contact poisons. As a general rule admitting of several exceptions, compounds of the alkali metals and the alkaline earth metals act as promoters of the catalytic power. On the other hand, the metalloids, such for instance as sulfur, selenium, tellurium, arsenic, phosphorus, and also the easily fusible and easily reducible metals, such for instance as lead, tin, and zinc, generally act as contact poisons, whether the said element be added or be present as such or in the form of a suitable compound thereof. Since it is evident that during the passage of the mixture of hydrogen and nitrogen over the contact material the body or promoter added may undergo some chemical change, we do not wish to be understood as confining our invention to the use of the specific compounds of the elements mentioned.

Although we have mentioned a number of bodies which act as promoters and a number of instances of contact poisons, these instances do not exhaust the number of bodies having the effects mentioned. We have found that an enormous number of bodies have more or less action in the ways mentioned, and these bodies belong to various classes of chemical substances, so that it is impossible to give a definition of promoters in terms, making the class of promoters coincident with some class or classes of chemical bodies. Thus we have found that bodies that are not alkaline earths or alkaline metals or compounds thereof will act as promoters, and we do not desire our patent to be restricted to promoters which fall into the classes of alkaline earths and alkalis. We have devised a simple test whereby it can readily be ascertained whether any body is a promoter in the sense of this specification. The test is conducted as follows: Prepare an intimate mixture of the test body and the barium catalyst in a suitable way. This may be done in some cases by mechanical mixture, in others by chemical precipitation on the catalyst, or by mixing amalgams of the two metals and then distilling off the mercury, or by a suitable combination of one or more of these methods. Set the product so obtained as a catalyst in a tube-furnace side by side with another tube containing an equal quantity of the untreated catalyst without any addition, and pass equal currents of a mixture of nitrogen and hydrogen in their combining proportions through both tubes under identical conditions, and measure the quantity of ammonia obtained in both cases. If the yield of ammonia is increased by the treatment with the added body, this may be regarded as a promoter.

As instances of the bodies which can be employed as promoters according to our invention, we mention oxids or other suitable compounds of the group of alkali metals, or the alkaline earth metals, of the group of the earth metals, of the group of the rare earth metals, also silica, tantalum, niobium, and the like. We include in our invention both alkali metals and alkali earth metals under the phrase alkali-forming metals. As a general rule, those metals or compounds of these metals which yield oxids and salts which are non-reducible by hydrogen are suitable for use as promoters. Generally speaking, any one or more of the aforesaid promoters can be employed.

When working according to this invention yields of 6% or more of ammonia can easily be produced.

The following example will serve to illustrate further the nature of our invention, which, however, is not in any way confined to this example: Mix metallic barium with three per cent. of its weight of potassium nitrate and place the mixture in a contact tube. On passing the mixture of nitrogen and hydrogen which is completely dry and free from oxygen and contact poison through the tube while heating, at a temperature of about 550° C. and a pressure of 200 atmospheres, results are obtained which are several times better than those obtained with barium alone.

It has been found advantageous that the catalytic mixture consist of barium and a promoter which belongs preferably to a different group or, at any rate, to a different sub-group of the periodic system. Thus for instance, mixtures of barium and chromium, or barium and osmium, or of barium and magnesium, are also suitable for the purposes of this invention.

We do not claim in this present application generically the production of ammonia while making use of a catalytic agent together with a promoter in each case, such production and such catalytic mixtures being embodied in the claims of the aforesaid application for Patent No. 599,100, filed December 24, 1910.

Now what we claim is:—

1. An active catalyst for the manufacture of ammonia from its elements containing barium and a promoter.

2. An active catalyst for the manufacture of ammonia from its elements containing barium and an oxid of an alkali-forming metal.

3. An active catalyst for the manufacture of ammonia from its elements containing barium and potassium oxid.

4. The process of manufacturing ammonia by passing a mixture containing nitrogen and hydrogen free from contact poison over an active catalyst containing barium and a promoter.

5. The process of manufacturing ammonia by passing a mixture containing nitrogen and hydrogen free from contact poison over an active catalyst containing barium and an oxid of an alkali-forming metal.

6. The process of manufacturing ammonia by passing a mixture containing nitrogen and hydrogen free from contact poison over an active catalyst containing barium and potassium oxid.

In testimony whereof we have hereunto set our hands in the presence of two subscribing witnesses.

CARL BOSCH.
ALWIN MITTASCH.
HANS WOLF.
GEORG STERN.

Witnesses:
J. ALEC. LLOYD,
A. O. TITTMANN.